(12) United States Patent
Srinivas

(10) Patent No.: US 12,717,724 B2
(45) Date of Patent: Aug. 25, 2026

(54) GAT BLOCK ALLOCATION

(71) Applicant: Sandisk Technologies, Inc., Milpitas, CA (US)

(72) Inventor: Akshay Teeka Srinivas, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 39 days.

(21) Appl. No.: 18/766,012

(22) Filed: Jul. 8, 2024

(65) Prior Publication Data

US 2026/0010481 A1 Jan. 8, 2026

(51) Int. Cl.

*G06F 12/0871* (2016.01)
*G06F 12/0873* (2016.01)
*G06F 13/16* (2006.01)

(52) U.S. Cl.

CPC ...... *G06F 12/0871* (2013.01); *G06F 12/0873* (2013.01); *G06F 13/1668* (2013.01)

(58) Field of Classification Search

CPC ............. G06F 12/0238; G06F 12/0873; G06F 12/0871; G06F 2212/222; G06F 13/404; G06F 12/00; G06F 13/1668; G06F 12/0246; G06F 2212/7201; G06F 2212/7208

USPC ................................ 711/118, 103, 202, 206

See application file for complete search history.

(56) References Cited

U.S. PATENT DOCUMENTS 10,776,280 B1 * 9/2020 Yang .................. G06F 12/0246
11,144,471 B1 * 10/2021 Cariello ................ G11C 16/26
2014/0195725 A1 * 7/2014 Bennett .............. G06F 12/0246 711/103
2019/0220229 A1 * 7/2019 No ..................... G06F 11/1048
2019/0227931 A1 * 7/2019 Jung .................. G06F 12/0607
2022/0004336 A1 * 1/2022 Naghate ................ G11C 16/32
2023/0384974 A1 * 11/2023 Agarwal .............. G06F 3/0658
2024/0403211 A1 * 12/2024 Wu .................... G06F 13/1673

* cited by examiner

*Primary Examiner* — Hashem Farrokh
(74) *Attorney, Agent, or Firm* — Michael Best & Friedrich LLP

(57) ABSTRACT

A data storage device with efficient page table block allocation. In one example, a memory includes a plurality of memory dies. A controller is configured to allocate a first region of the memory for storing data received from an external electronic device, and allocate a second region of the memory for storing metadata associated with the data. The first region includes a first memory die of the plurality of memory dies, and the second region includes a second memory die of the plurality of memory dies different from the first memory die. The controller is further configured to receive, from the external electronic device, a write command including first data to be written to the memory, control the memory to write the first data to the first region, generate first metadata associated with the first data, and control the memory to write the first metadata to the second region.

17 Claims, 5 Drawing Sheets

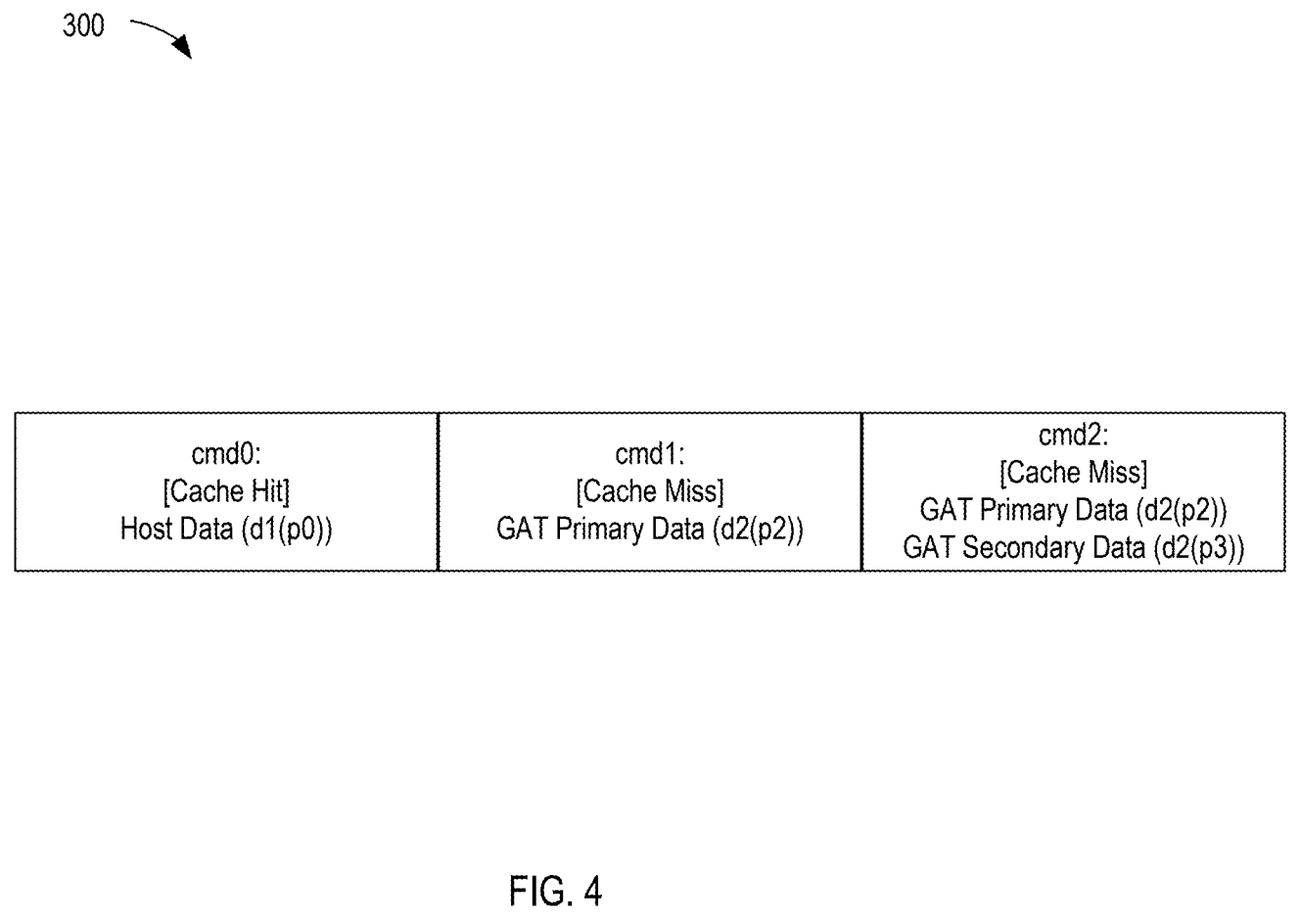

300 cmd0:
[Cache Hit]
Host Data (d1(p0))

cmd1:
[Cache Miss]
GAT Primary Data (d2(p2))

cmd2:
[Cache Miss]
GAT Primary Data (d2(p2))
GAT Secondary Data (d2(p3))

FIG. 4

GAT BLOCK ALLOCATION

FIELD

This application relates generally to data storage devices and, more particularly, to command pipeline execution in data storage devices.

SUMMARY

In memory systems, host writes are typically associated with control writes for storing control data, otherwise referred to as metadata, associated with the host write. Metadata includes, for example, logical-to-physical (L2P) mapping information associated with host data. As a result, resolving a host command location involves performing multiple reads to a page table, otherwise referred to as a group allocation (GAT) table. In systems where caches are employed, the system firmware may rely on cache hits to determine host locations.

Conventionally, approaches to handling multiple host commands in a memory system include, for example, first resolving all host locations (e.g., logical block addresses (LBAs)) for each command in the NAND before issuing a data sense command (e.g., an asynchronous independent plane read (AIPR) sense command), and next servicing each of the commands. Other methods include resolving a first command of the plurality of commands, executing the resolved command, resolving the next command of the plurality of commands, and executing the next resolved command, so on and so forth. Another method includes maintaining a single open control block catering to all metadata. Each of these conventional methods may result in an overall decrease in the speed at which host locations are resolved, and a decrease in the measured input/output operations per second (IOPS) in the memory system.

Thus, there is a need for intelligent GAT page management to improve address resolution time in a memory system by increasing IOPS in the memory system. One example provides a data storage device including a memory having a plurality of memory dies; and an electronic controller configured to: allocate a first region of the memory for storing data received from an external electronic device, the first region including a first memory die of the plurality of memory dies, allocate a second region of the memory for storing metadata associated with the data received from the external electronic device, the second region including a second memory die of the plurality of memory dies that is different from the first memory die, receive a write command from the external electronic device, the write command including first data to be written to the memory, control the memory to write the first data to the first region, generate first metadata associated with the first data, and control the memory to write the first metadata associated with the first data to the second region.

In some aspects, the metadata associated with the data received from the external electronic device includes logical-to-physical (L2P) mapping information that maps to storage locations of the data received from the external electronic device.

In some aspects, the first metadata includes primary metadata and secondary metadata, each memory die of the plurality of memory dies includes a plurality of memory planes, the memory is configured to perform asynchronous independent plane reads (AIPR) on the plurality of memory dies, and the electronic controller is further configured to: control the memory to store the primary metadata to a first memory plane in the second region, and control the memory to store the secondary metadata to a second memory plane in the second region that is different from the first memory plane, the first memory plane and the second memory plane being located in a same memory die.

In some aspects, the primary metadata and the secondary metadata include duplicate L2P information.

In some aspects, the electronic controller is further configured to: receive a plurality of commands, generate a pipeline for executing the plurality of commands, the pipeline including a first command for sensing the first metadata and a second command for sensing second metadata associated with second data received from the external electronic device, the second metadata including primary metadata stored in the first memory plane, and execute the pipeline by the executing the first command and the second command, wherein executing the first command includes sensing the secondary metadata of the first metadata, executing the second command includes sensing the primary metadata of the second metadata, and executing the first command and executing the second command includes a parallelization of plane senses.

In some aspects, the electronic controller is further configured to: receive a plurality of commands, generate a pipeline for executing the plurality of commands, the pipeline including a first command that instructs sensing of a first memory location in the first region and a second command that instructs sensing of a second memory location in the second region, execute the pipeline by parallelizing die senses for the first command and the second command.

In some aspects, the first memory location corresponds to a first storage location of the first data received from the external electronic device and the second memory location corresponds to a second storage location of second metadata associated with third data received from the external electronic device.

In some aspects, the data storage device further includes a memory cache storing a copy of the first metadata, wherein the electronic controller is configured to check the cache for the first metadata, and sense the first data in the first region in response to a cache hit for the first metadata.

In some aspects, the electronic controller is configured to check the cache for the second metadata, and sense the second metadata in the second region in response to a cache miss for the second metadata.

In some aspects, the plurality of memory dies is organized into a plurality of metaplanes, the plurality of metaplanes having a first metaplane including the first memory die and a second metaplane including the second memory die, the first region includes the first metaplane, and the second region includes the second metaplane.

In some aspects, the first metaplane includes a third memory die and the second metaplane includes a fourth memory die.

Another example provides a method including: allocating, with an electronic controller, a first region of a memory for storing data received from an external electronic device, the first region including a first memory die of a plurality of memory dies; allocating, with the electronic controller, a second region of the memory for storing metadata associated with the data received from the external electronic device, the second region including a second memory die of the plurality of memory dies that is different from the first memory die; receiving, with the electronic controller, a write command from the external electronic device, the write command including first data to be written to the memory; controlling, with the electronic controller, the memory to write the first data to the first region; generating, with the electronic controller, first metadata associated with the first data; and controlling, with the electronic controller, the memory to write the first metadata associated with the first data to the second region.

In some aspects, the metadata associated with the data received from the external electronic device includes logical-to-physical (L2P) mapping information that maps to storage locations of the data received from the external electronic device.

In some aspects, the first metadata includes primary metadata and secondary metadata, each memory die of the plurality of memory dies includes a plurality of memory planes, the memory is configured to perform asynchronous independent plane reads (AIPR) on the plurality of memory dies, and the method further includes: controlling the memory to store the primary metadata to a first memory plane in the second region, and controlling the memory to store the secondary metadata to a second memory plane in the second region that is different from the first memory plane, the first memory plane and the second memory plane being located in a same memory die.

In some aspects, the primary metadata and the secondary metadata include duplicate L2P information.

In some aspects, the method further includes: receiving a plurality of commands; generating a pipeline for executing the plurality of commands, the pipeline including a first command for sensing the first metadata and a second command for sensing second metadata associated with second data received from the external electronic device, the second metadata including primary metadata stored in the first memory plane; and executing the pipeline, wherein executing the first command includes sensing the secondary metadata of the first metadata, executing the second command includes sensing the primary metadata of the second metadata, and executing the first command and executing the second command includes a parallelization of plane senses.

Another example provides a data storage device including a memory having a plurality of memory dies, wherein each memory die of the plurality of memory dies includes a plurality of memory planes, and the memory is configured to perform asynchronous independent plane reads (AIPR) on the plurality of memory dies; and an electronic controller configured to: receive a write command from an external electronic device, the write command including first data to be written to the memory, control the memory to write the first data to a first region of the memory, generate first metadata associated with the first data, the first metadata including primary metadata and secondary metadata, and control the memory to write the first metadata associated with the first data to a second region of the memory by controlling the memory to store the primary metadata to a first memory plane in the second region, and controlling the memory to store the secondary metadata to a second memory plane in the second region that is different from the first memory plane, the first memory plane and the second memory plane being located in a same memory die.

In some aspects, the electronic controller is further configured to: allocate the first region of the memory for storing data received from the external electronic device, the first region including a first memory die of the plurality of memory dies, and allocate the second region of the memory for storing metadata associated with the data received from the external electronic device, the second region including a second memory die of the plurality of memory dies that is different from the first memory die.

In some aspects, the first metadata includes logical-to-physical (L2P) mapping information that maps to a storage location of the first data received from the external electronic device.

In some aspects, the primary metadata and the secondary metadata include duplicate L2P information.

Other aspects of the invention will become apparent by consideration of the detailed description and accompanying drawings.

BRIEF DESCRIPTION OF THE DRAWINGS

FIG. 4 is a diagram of an example set of data commands, in accordance with some embodiments of the disclosure.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, MRAM, etc.

Figure 1:
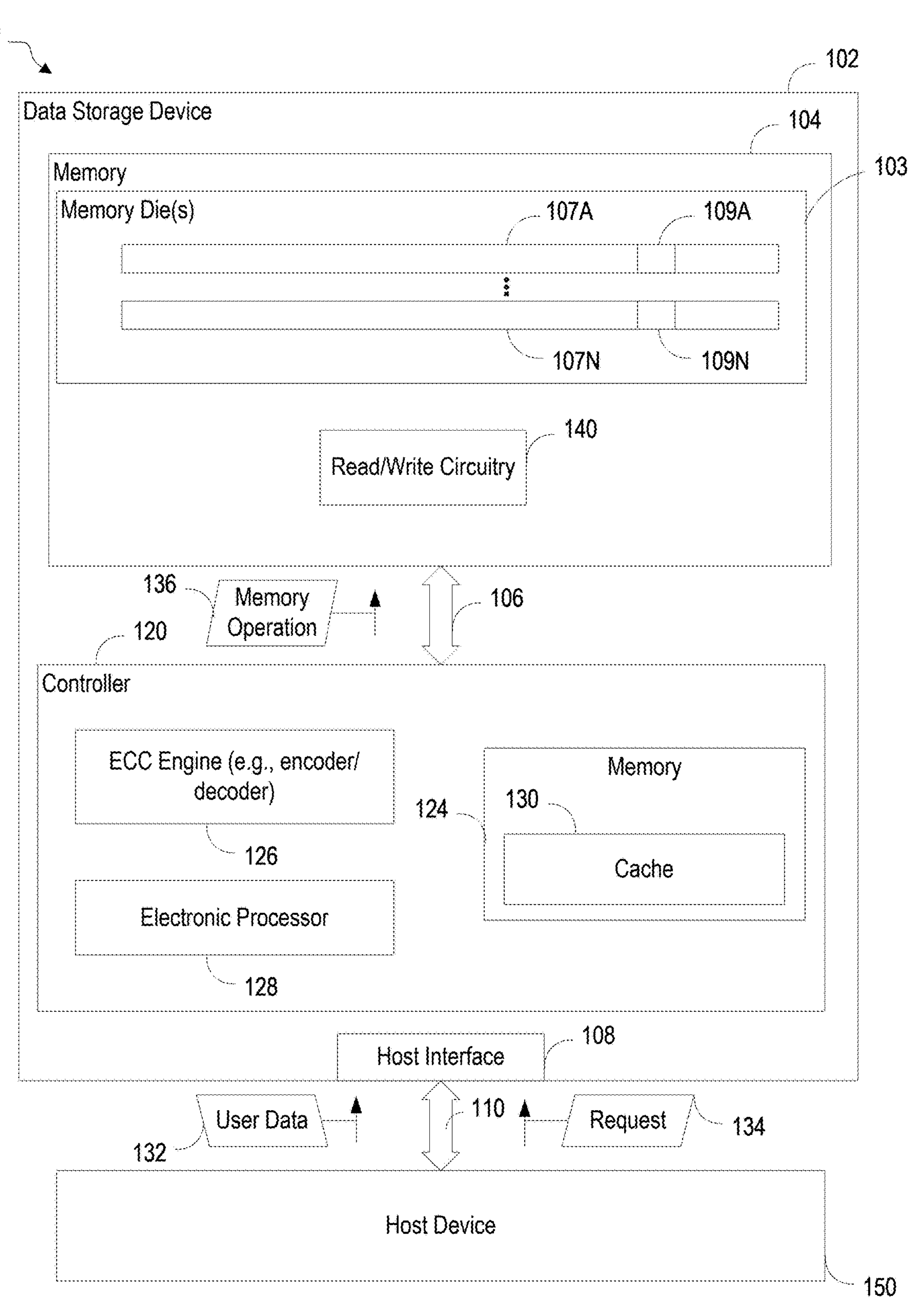
FIG. 1 is a block diagram of a system including a data storage device and a host device, in accordance with some embodiments of the disclosure.

FIG. 1 is a block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. The data storage device controller 120 may also include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled by means of a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 by means of the communication path 110, such as a wired communication path and/or a wireless communication path. For example, the data storage device 102 may include an interface 108 (e.g., a host interface) that enables communication using the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104, or to request data, by request 134, to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates with a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. A set of dies of the memory 104 may be logically grouped as a metaplane. A metablock may include a group of multiple blocks that are located in memory dies of the same metaplane that are processed together as if they were a single large block. For example, the metaplane may include two memory dies. In other implementations, a metaplane may include more than two dies.

Each die 103 may include one or more planes, which in turn include one or more blocks. Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively. Data from the host may be written to one or more metablocks. A metablock may be selected from the one or more blocks spanning across multiple planes. The pages of the one or more blocks may be grouped together and referred to as a metapage.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies. For example, the read/write circuitry 140 may be configured to perform various read/write operations such as initial writing to volatile memory, array commit functions, and other functions as required for a given application.

The data storage device 102 includes the data storage device controller 120 coupled to the memory 104 (e.g., the one or more memory dies 103) using a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150 according to host commands received from the host device 150. For example, the data storage device controller 120 may send data to the host device 150 using the interface 108, and the data storage device controller 120 may receive data from the host device 150 using the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data (e.g., host data) to a specified address of the memory 104. The write command may specify a physical address of a portion of the memory 104 (e.g., a physical address of a word line of the memory 104) that is to store the data. Each write command may include a host data write for storing the host data and a control data write for storing metadata associated with the host data. The metadata includes, for example, mapping information (e.g., L2P mapping information) generated by the device controller 120 for locating the host data.

The data storage device controller 120 is configured to send a read command to the memory 104 to access data from a specified address of the memory 104. The read command may specify the physical address of a region of the memory 104 (e.g., a physical address of a word line of the memory 104). The data storage device controller 120 may also be configured to send data and commands to the memory 104 associated with background scanning operations, garbage collection operations, and/or wear-leveling operations, or other suitable memory operations.

The data storage device controller 120 may include at least one memory 124 (for example, at least one random access memory ("RAM"), at least one read-only memory ("ROM"), at least one non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128 for performing, among other things, the operations and methods described herein.

Additionally, although the data storage device controller 120 is illustrated in FIG. 1 as including the at least one memory 124, in other implementations, some or all of the at least one memory 124 is instead located separate from the data storage device controller 120 and executable by the electronic processor 128 or a different electronic processor that is external to the data storage device controller 120 and/or the data storage device 102. For example, the at least one memory 124 may include dynamic random-access memory (DRAM) that is separate and distinct from the data storage device controller 120. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

The device controller 120 maintains a logical-to-physical (L2P) table that maps logical addresses used by the host device to physical addresses used by the memory 104. The L2P table is also referred to herein as a group allocation table (GAT). Each GAT entry may contain mapping information for a predetermined number of sectors that map to one or more physical addresses in the memory 104. The memory 124 may store a cache 130 having copies of recently accessed GAT entries. When the device controller 120 receives a request to perform an L2P operation (e.g., a write operation), the device controller 120 may first search the cache 130 to resolve the LBA location of the operation. In the event of a cache miss, the device controller 120 performs a first read operation in the memory 104 to determine the host LBA location, and a second read operation of the actual host LBA.

Figure 2:
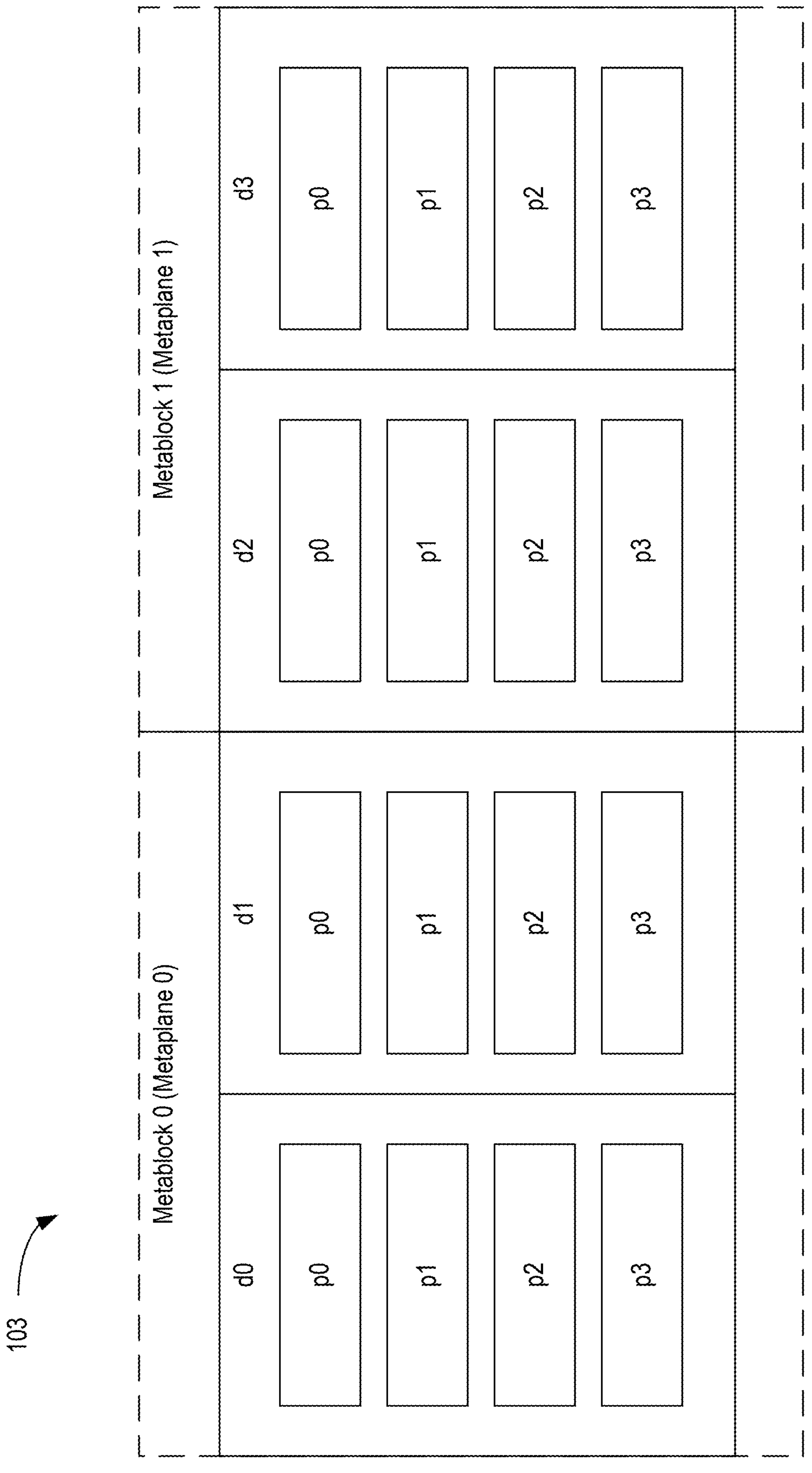
FIG. 2 is a bock diagram of a set of memory dies, in accordance with some embodiments of the disclosure.

As described above, the set of dies 103 may be logically grouped as a metaplane, and a metablock may include a group of multiple blocks that are located in memory dies of the same metaplane. FIG. 2 illustrates an example set of dies 103 having such an arrangement in the memory 104. As illustrated in FIG. 2, the set of dies 103 may include four memory dies (die0-die3), grouped into two separate metaplanes (Metaplane 0 and Metaplane 1). However, FIG. 2 is provided for ease of understanding, and the set dies 103 may include more than four dies or less than four dies. The first die d0 and the second die d1 are grouped into a first metaplane (Metaplane 0), and the third die3 and fourth die d3 are grouped into a second metaplane (Metaplane 1). In the illustrated example, each metaplane includes one metablock. However, in other examples, each metaplane may include more than one metablock.

In the illustrated example, each memory die (d0-d3) includes four respective planes (p0-p3). Host writes are routed to open update blocks, which are designated metablocks having a fixed metaplane. For each host command, the device controller 120 first refers to a GAT page stored in the memory 104 to determine the host LBA location, then accesses the determined host LBA to service the command. As described above, conventional approaches to resolving multiple host commands (e.g., maintaining a single open control block for all metadata) result in overall increases in processing time of the system 100. Therefore, the device controller 120 described herein is configured to maintain multiple open control bocks spread across different planes and/or metaplanes.

The device controller 120 is configured to store metadata (e.g., GAT pages) and host data regions to respectively different regions (e.g., different memory planes, different memory dies, and/or different memory metaplanes) from one another. By separating the storage locations of host data and metadata, the device controller 120 can perform read operations in parallel between the distinct regions and, as a result, resolve more than one host command in parallel. For example, host data of a first command can be sensed in parallel with control data of a subsequent command.

In some instances, such as when the data storage device 102 is configured with Asynchronous Independent Plane Read (AIPR) capability, the device controller 120 may store metadata to first memory planes and host data to second memory planes different from the first memory planes. For example, the device controller 120 may designate a first set of planes (e.g., one or more planes) within a particular die or set of dies 103 to store host data, and designate a second set of planes within a particular die or set of dies 103 to store metadata.

In some instances, the device controller 120 is configured to parallelize die senses such that the device controller 120 may resolve multiple host commands in parallel even without AIPR support. Accordingly, regardless of whether the data storage device 102 is configured with AIPR, the device controller 120 may allocate a first set of the memory dies 103 to write host data for a command, and allocate a second non-overlapping set of the memory dies 103 to write the corresponding metadata (e.g., mapping information) of the host data.

Figure 3:
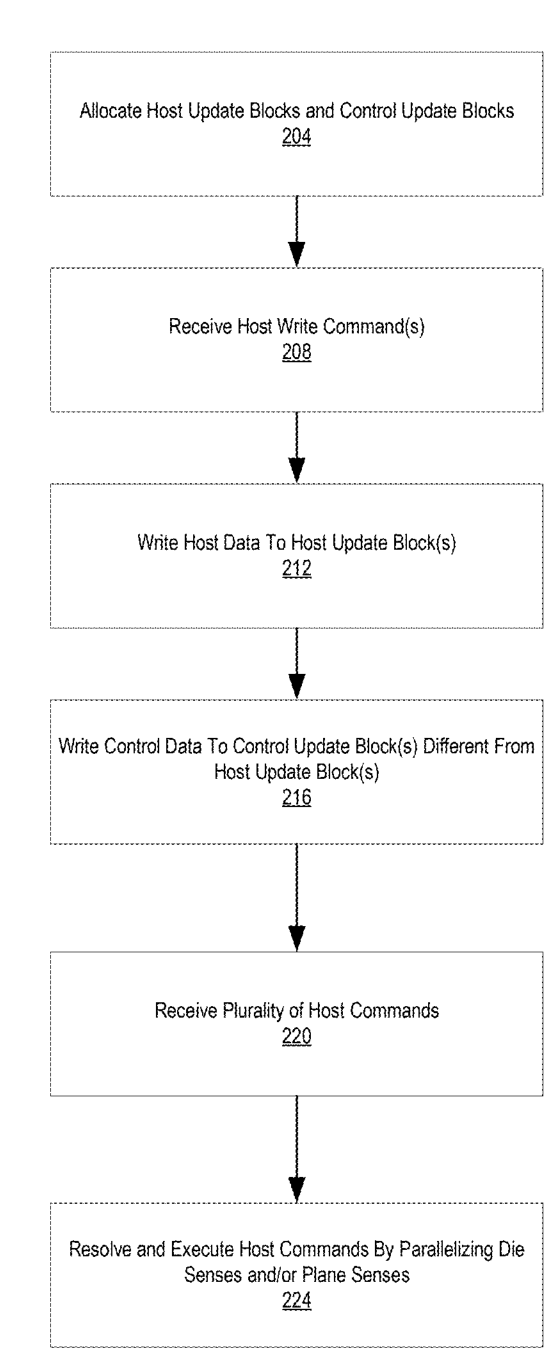
FIG. 3 is a flowchart illustrating a method of allocating host data blocks and control data blocks in a data storage device, in accordance with some embodiments of the disclosure.

FIG. 3 is a flowchart illustrating an example method 200 for allocating host data blocks and control data blocks in a data storage device 102 with or without AIPR capability. While FIG. 3 illustrates a particular order of the method 200, in some embodiments, the method 200 may be performed in a different order.

The method 200 includes allocating, with the device controller 120, a first region of the memory as a set of host update blocks for storing host data (e.g., LBA ranges) and a second region of the memory as a set of control update blocks to store metadata (e.g., GAT pages) (at bock 204). For example, the device controller 120 may select a first metaplane and/or a first set of dies for storing host data (e.g., the first die do and the second die d1 of FIG. 2) and allocate a second metaplane and/or a second set of dies (e.g., the third die d2 and fourth die d3 of FIG. 2) to store metadata. The host update blocks and the control update blocks may be spread across different planes and/or metaplanes of the memory 104. In some instances, regions of the memory 104 allocated for storage of host data and metadata are arranged within the same metaplane but different dies. In other instances, the device controller 120 may store metadata in separate metaplanes from host data.

The method 200 includes receiving, with the device controller 120, a host write command including host data (e.g., user data) to be written to the memory 104 (at block 208). The device controller 120 services the write command by writing the host data to a designated host update block (at bock 212) and writing control data, or metadata, associated with the host data to a designated control update block (at block 216). For example, the device controller 120 writes the host data to a first die (e.g., the first die do of FIG. 2) and writes the corresponding metadata, which is data that maps to the host data physical location, to a die that is different from the first die (e.g., the second die d1, the third die d2, the fourth die d3, etc.).

In some instances, control data, or metadata, includes primary control data and secondary control data that is duplicate to the primary control data. For example, important host commands may be associated with both primary and secondary control data. Additionally, in some instances, the data storage device 102 is configured with AIPR capability to enable parallel data sensing at the plane level rather than only at the die level. In such instances where control data includes primary and secondary control data, and where the data storage device 102 has AIPR capability, writing the control data to a designated control update block (at block 216) may include writing the primary control data to a first plane in the designated control update block and writing the secondary control data to a second plane in the designated control update block that is different from the first plane. In this manner, when resolving multiple host commands in a data storage device 102 having AIPR capability, the device controller 120 may sense either the first control data or the second control data of each command as needed to maximize parallel sensing among the multiple commands.

In some instances where the data storage device 102 has AIPR capability, the device controller 120 separates host data from control data at the plane level rather than at the die level. For example, the device controller 120 may designate particular planes within a single die as respective host data planes and respective control data planes.

The method 200 further includes receiving, with the device controller 120, a plurality of host commands each being associated with a respective command location (at block 220). In response to receiving the plurality of commands, the device controller 120 resolves and executes the plurality of commands by parallelizing die senses and/or plane senses (e.g., in instances of AIPR capability) to execute two or more commands in parallel (at block 224).

Resolving and executing the plurality of commands may include, for example, generating a command execution pipeline for the plurality of commands. FIG. 4 illustrates an example set of host commands 300 that the device controller 120 may receive and organize into a command execution pipeline.

In the illustrated example, a first command cmd0 may result in a cache hit in in response to checking, with the device controller 120, the cache 130 for the metadata associated with the first command cmd0. As a result, the device controller 120 does not need to sense the metadata (e.g., the GAT data) associated with the host command, and instead, executing the command includes sensing the actual LBA in the memory 104, located for example at plane p0 of a die d1 designated in a host control block.

A second command cmd2 may result in a cache miss and, as a result, executing the command includes reading the GAT page information for the command, which in the illustrated example has primary control data located at plane p2 of die d2. Because the device controller 120 is configured to write metadata to different dies than the host data, the device controller 120 may resolve the first command cmd0 in parallel with the second command cmd1 even when the data storage device 102 is not configured with AIPR, and therefore reduces stall time. This reduction in stall time in turn results in faster processing speed and greater IOPS in the memory device 102.

A third command cmd2 may also result in a cache miss such that the device controller 120 must sense the GAT page for the third command cmd2, which in the illustrated example has primary control data located at plane p2 of die d2 and secondary control data locate at plane p3 of die 2. In instances where the data storage device 102 is configured with AIPR to enable parallel plane reads within a die, the device controller 120 may resolve the first command cmd0, the second command cmd1, and the third command cmd2 in parallel by sensing the secondary control data of the third command cmd2 rather than sensing the primary control data of the third command cmd2.

A conventional memory system may not be able to resolve both the second command cmd2 and the third command cmd3 in parallel even with AIPR when the primary control data of the second command cmd2 and the primary control data of the third command cmd3 are located on the same plane of the same die. In contrast, in instances where GAT data for two consecutive commands share a primary control data plane, the device controller 120 may use the AIPR functionality to resolve the two commands in parallel by sensing the primary control data of the first command (e.g., stored in a first plane) and sensing the secondary control data of the second command (e.g., stored in a second plane different from the first plane).

In some instances, the memory 104 (e.g., the host update blocks of the memory dies 103) includes ranges of host LBAs having no data written by the device controller 120. An erased read occurs when the device controller 120 attempts to read a blank storage element in the memory dies 103. Erased reads that occur during execution of multiple host commands (e.g., while executing the plurality of commands received at block 220 of the method 200) may result in the device controller 120 stalling the execution pipeline. For example, the conventional approach to handling erased reads during execution of a plurality of commands is to first complete execution of all commands prior to the erased read in the pipeline before executing the erased read command in order to maintain control of execution flow and buffer overflows. The resulting breakage of the data path pipeline thus causes performance degradation in the data storage device 102. Therefore, FIG. 5 illustrates an example method 400 for more quickly servicing erased reads included in a plurality of host commands for a data storage device 102 having AIPR capability.

Figure 5:
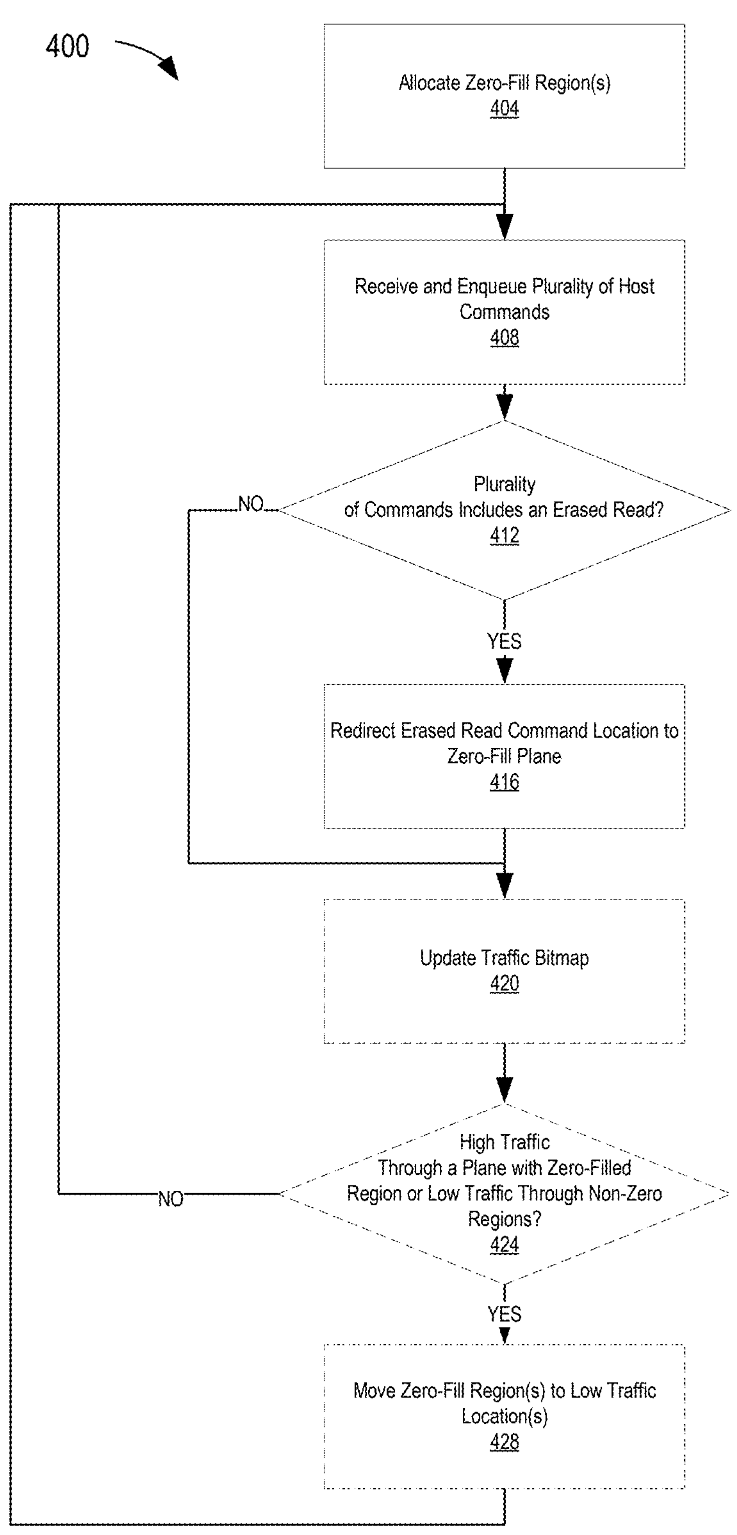
FIG. 5 is a flow chart illustrating a method of handling erased reads in a data storage device, in accordance with some embodiments of the disclosure.

While FIG. 5 illustrates a particular order of the method 400, in some embodiments, the method 400 may be performed in a different order. The method 400 may be performed in conjunction with the method 200 of FIG. 3. The method 400 may be performed in response to, for example, a power on or other initialization of the data storage device 102.

The method 400 includes designating at least one region in the memory 104 for servicing erased reads, and zero-filling the at least one designated region (at block 404). Each designated zero-filled region includes at least a portion of a plane (e.g., 10% of the plane, 25% of the plane, 50% of the plane, 75% of the plane, 100% of the plane, etc.) in the memory dies 103. The device controller 120 may designate at least one region for each memory die 103 or for a selected set of memory dies 103. For example, the device controller 120 may designate at least one region for each memory die 103 allocated for host data (e.g., the first die d0 and second die d2 of the example of FIG. 2). In some instances, the device controller 120 designates a plurality of regions in each selected die 103 as zero-filled regions. For example, the device controller 120 may designate, as the zero-filled regions, a portion of each plane in a memory die 103, or a portion of each of a subset of planes in a die 103 (e.g., 10% of the planes in a memory die 103, 25% of the planes in a memory die 103, 50% of the planes in a memory die 103, 75% of the planes in a memory die 103, etc.)

The method 400 further includes receiving and enqueuing for execution, with the device controller 120, a plurality of host commands (at block 408). For example, the device controller 120 may organize the plurality of host commands into an execution pipeline for parallel and/or sequential execution of the plurality of commands. In response to receiving and enqueuing the plurality of commands, the device controller 120 determines whether the plurality of commands includes an erased read command (at decision block 412). For example, the device controller 120 determines whether a host command included in the plurality of commands is directed to an LBA having no written data.

In response to determining that the plurality of commands includes an erased read command ("YES" at decision block 412), the device controller 120 redirects a target location of the erased read command to a designated zero-filled region (at block 416). The device controller 120 may select the zero-filled region for redirecting the command based on the command locations of other commands in the execution pipeline (e.g., others of the plurality of commands enqueued at block 408). The device controller 120 may monitor traffic to each of the planes and selects, for redirection of the erased read, the zero-filled region that is in the plane having the least traffic. As an example, with reference to FIG. 2, the plurality of commands may include a first command with a target location of the second plane p1 of the first die do, a second command with a target location of the third plane p2 of the first die d0, a third command with a target location of the fourth plane p3 of the first die do, and a fourth command that is an erased read command. Because planes p1, p2, and p3 are active, the device controller 120 may select plane p0, which is a lower traffic plane that is available for data sensing, as the zero-filled region for redirection of the erased read command. In response to determining that the plurality of commands does not include an erased read command ("NO" at decision block 412), the device controller 120 bypasses the erased read redirection step of block 416.

In some instances, the device controller 120 maintains a traffic bitmap (e.g., stored in the memory 124) for tracking the traffic through the memory 104 (e.g., the traffic through each plane in the memory dies 103). In such instances, the method 400 may include updating, with the device controller 120, the traffic bitmap by, for example, incrementing a usage count of each plane having a respective command location during execution of the plurality of commands (at block 420).

Based on the traffic bitmap, the device controller 120 determines whether a respective die 103 of the memory 104 has high traffic through any planes having zero-filled regions or low traffic through any planes without zero-filled regions (at decision block 424). For example, the device controller 120 may determine, using the traffic bitmap, whether command traffic in one or more planes having a zero filled region is sufficiently greater than (e.g., greater than by a threshold) command traffic in one or more planes not having zero-filled regions.

In response to determining that a respective die 103 has higher traffic through a first plane having zero-filled regions and lower traffic through a second plane without zero-filled regions ("YES" at decision block 424), the device controller 120 moves the zero-filled region from the higher traffic first plane to the lower traffic second plane (at block 428). The second plane may be, for example, the plane having the least command traffic in the respective die 103 relative to other planes not having zero-filled regions.

In response to moving the zero-filled region from the higher traffic first plane to the lower traffic second plane (at block 428), or in response to determining that the memory 104 does not have high traffic through any planes having zero-filled regions or low traffic through any planes without zero-filled regions ("NO" at decision block 424), the device controller 120 continues memory operations of the data storage device 102 and repeats blocks 408-428 of the method 400.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot store information to blocks of a solid state drive, among other features and functions set forth herein).

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data storage device comprising:

a memory having a plurality of memory dies; and an electronic controller configured to:

allocate a first region of the memory for storing data received from an external electronic device, the first region including a first memory die of the plurality of memory dies, allocate a second region of the memory for storing metadata associated with the data received from the external electronic device, the second region including a second memory die of the plurality of memory dies that is different from the first memory die, receive a write command from the external electronic device, the write command including first data to be written to the memory, control the memory to write the first data to the first region, generate first metadata associated with the first data, and control the memory to write the first metadata associated with the first data to the second region, wherein the metadata associated with the data received from the external electronic device includes logical-to-physical (L2P) mapping information that maps to storage locations of the data received from the external electronic device.

2. The data storage device of claim 1, wherein the first metadata includes primary metadata and secondary metadata, each memory die of the plurality of memory dies includes a plurality of memory planes, the memory is configured to perform asynchronous independent plane reads (AIPR) on the plurality of memory dies, and the electronic controller is further configured to:

control the memory to store the primary metadata to a first memory plane in the second region, and control the memory to store the secondary metadata to a second memory plane in the second region that is different from the first memory plane, the first memory plane and the second memory plane being located in a same memory die.

3. The data storage device of claim 2, wherein the primary metadata and the secondary metadata include duplicate L2P information.

4. The data storage device of claim 2, wherein the electronic controller is further configured to:

receive a plurality of commands, generate a pipeline for executing the plurality of commands, the pipeline including a first command for sensing the first metadata and a second command for sensing second metadata associated with second data received from the external electronic device, the second metadata including primary metadata stored in the first memory plane, and execute the pipeline by the executing the first command and the second command, wherein executing the first command includes sensing the secondary metadata of the first metadata, executing the second command includes sensing the primary metadata of the second metadata, and executing the first command and executing the second command includes a parallelization of plane senses.

5. The data storage device of claim 1, wherein the electronic controller is further configured to:

receive a plurality of commands, generate a pipeline for executing the plurality of commands, the pipeline including a first command that instructs sensing of a first memory location in the first region and a second command that instructs sensing of a second memory location in the second region, execute the pipeline by parallelizing die senses for the first command and the second command.

6. The data storage device of claim 5, wherein the first memory location corresponds to a first storage location of the first data received from the external electronic device and the second memory location corresponds to a second storage location of second metadata associated with third data received from the external electronic device.

7. The data storage device of claim 6, further including a memory cache storing a copy of the first metadata, wherein the electronic controller is configured to check the cache for the first metadata, and sense the first data in the first region in response to a cache hit for the first metadata.

8. The data storage device of claim 7, wherein the electronic controller is configured to check the cache for the second metadata, and sense the second metadata in the second region in response to a cache miss for the second metadata.

9. The data storage device of claim 1, wherein the plurality of memory dies is organized into a plurality of metaplanes, the plurality of metaplanes having a first metaplane including the first memory die and a second metaplane including the second memory die, the first region includes the first metaplane, and the second region includes the second metaplane.

10. The data storage device of claim 9, wherein the first metaplane includes a third memory die and the second metaplane includes a fourth memory die.

11. A method comprising:

allocating, with an electronic controller, a first region of a memory for storing data received from an external electronic device, the first region including a first memory die of a plurality of memory dies;

allocating, with the electronic controller, a second region of the memory for storing metadata associated with the data received from the external electronic device, the second region including a second memory die of the plurality of memory dies that is different from the first memory die;

receiving, with the electronic controller, a write command from the external electronic device, the write command including first data to be written to the memory;

controlling, with the electronic controller, the memory to write the first data to the first region;

generating, with the electronic controller, first metadata associated with the first data; and controlling, with the electronic controller, the memory to write the first metadata associated with the first data to the second region, wherein the metadata associated with the data received from the external electronic device includes logical-to-physical (L2P) mapping information that maps to storage locations of the data received from the external electronic device.

12. The method of claim 11, wherein the first metadata includes primary metadata and secondary metadata, each memory die of the plurality of memory dies includes a plurality of memory planes, the memory is configured to perform asynchronous independent plane reads (AIPR) on the plurality of memory dies, and the method further comprising:

controlling the memory to store the primary metadata to a first memory plane in the second region, and controlling the memory to store the secondary metadata to a second memory plane in the second region that is different from the first memory plane, the first memory plane and the second memory plane being located in a same memory die.

13. The method of claim 12, wherein the primary metadata and the secondary metadata include duplicate L2P information.

14. The method of claim 12, further comprising:

receiving a plurality of commands;

generating a pipeline for executing the plurality of commands, the pipeline including a first command for sensing the first metadata and a second command for sensing second metadata associated with second data received from the external electronic device, the second metadata including primary metadata stored in the first memory plane; and executing the pipeline;

wherein executing the first command includes sensing the secondary metadata of the first metadata, executing the second command includes sensing the primary metadata of the second metadata, and executing the first command and executing the second command includes a parallelization of plane senses.

15. A data storage device comprising:

a memory having a plurality of memory dies, wherein each memory die of the plurality of memory dies includes a plurality of memory planes, and the memory is configured to perform asynchronous independent plane reads (AIPR) on the plurality of memory dies; and an electronic controller configured to:

receive a write command from an external electronic device, the write command including first data to be written to the memory, control the memory to write the first data to a first region of the memory, generate first metadata associated with the first data, the first metadata including primary metadata and secondary metadata, and control the memory to write the first metadata associated with the first data to a second region of the memory by controlling the memory to store the primary metadata to a first memory plane in the second region, and controlling the memory to store the secondary metadata to a second memory plane in the second region that is different from the first memory plane, the first memory plane and the second memory plane being located in a same memory die, wherein the first metadata includes logical-to-physical (L2P) mapping information that maps to a storage location of the first data received from the external electronic device.

16. The data storage device of claim 15, wherein the electronic controller is further configured to:

allocate the first region of the memory for storing data received from the external electronic device, the first region including a first memory die of the plurality of memory dies, and allocate the second region of the memory for storing metadata associated with the data received from the external electronic device, the second region including a second memory die of the plurality of memory dies that is different from the first memory die.

17. The data storage device of claim 15, wherein the primary metadata and the secondary metadata include duplicate L2P information.

* * * * *